(12) United States Patent
Kim et al.

(10) Patent No.: US 10,031,665 B2
(45) Date of Patent: Jul. 24, 2018

(54) ELECTRONIC DEVICE HAVING TOUCH SCREEN AND METHOD FOR CHANGING DATA DISPLAYED ON THE TOUCH SCREEN

(71) Applicant: Samsung Electronics Co., Ltd., Suwon-si, Gyeonggi-do (KR)

(72) Inventors: Eun Sun Kim, Seoul (KR); Kyung Dae Park, Seoul (KR); Mi Na Kwag, Seoul (KR); Byung Joo Kim, Seoul (KR); Tae Won Um, Seoul (KR); Hyung Min Yook, Seoul (KR); Eun Soo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/353,253

(22) Filed: Nov. 16, 2016

(65) Prior Publication Data

US 2017/0068441 A1    Mar. 9, 2017

Related U.S. Application Data

(63) Continuation of application No. 12/643,538, filed on Dec. 21, 2009, now abandoned.

(30) Foreign Application Priority Data

Dec. 22, 2008  (KR) .................. 10-2008-0131299

(51) Int. Cl.
*G06F 3/0488* (2013.01)
*G06F 3/0484* (2013.01)
(Continued)

(52) U.S. Cl.
CPC .......... *G06F 3/04883* (2013.01); *G04G 5/04* (2013.01); *G04G 9/025* (2013.01); *G04G 21/08* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 5,563,996 | A | 10/1996 | Tchao |
| 6,489,951 | B1 | 12/2002 | Wong et al. |
| 8,327,272 | B2 | 12/2012 | Anzures et al. |
| 2003/0076301 | A1 | 4/2003 | Tsuk et al. |
| 2004/0196267 | A1 | 10/2004 | Kawai et al. |
| 2006/0093177 | A1 | 5/2006 | Kobayashi |
| 2007/0254722 | A1* | 11/2007 | Kim ................ G06F 3/0485 455/566 |

(Continued)

FOREIGN PATENT DOCUMENTS

| EP | 1947556 A1 | 7/2008 |
|---|---|---|
| KR | 10-2008-0068781 A | 7/2008 |

*Primary Examiner* — Jennifer Mehmood
*Assistant Examiner* — Deeprose Subedi
(74) *Attorney, Agent, or Firm* — Jefferson IP Law, LLP

(57) ABSTRACT

In a time data display mode, a time data is displayed in at least one display block partially assigned to a touch screen of an electronic device. After the touch gesture or the drag gesture is detected in one of the display block, the current time data in the display block can be replaced with a new time data according to the touch gesture or the drag gesture. The new time data may be a following time data or a previous time data which can be determined according to a location of the touch gesture, or a direction and a distance of the drag gesture. In addition, the extent of a change in the time data may be determined according to duration of the touch gesture or a speed of the drag gesture.

16 Claims, 8 Drawing Sheets

(51) Int. Cl.
  *G04G 21/08*   (2010.01)
  *G04G 9/02*    (2006.01)
  *G06F 3/041*   (2006.01)
  *G04G 9/04*    (2006.01)
  *G06F 3/0482*  (2013.01)
  *G06F 3/0485*  (2013.01)
  *G04G 5/04*    (2006.01)

(52) U.S. Cl.
  CPC .......... *G06F 3/0412* (2013.01); *G06F 3/0482* (2013.01); *G06F 3/0485* (2013.01); *G06F 3/04845* (2013.01); *G06F 3/04886* (2013.01)

(56) References Cited

U.S. PATENT DOCUMENTS

| | | |
|---|---|---|
| 2008/0094370 A1 | 4/2008 | Ording et al. |
| 2008/0165149 A1* | 7/2008 | Platzer .................. G04G 11/00 345/173 |
| 2008/0165150 A1 | 7/2008 | Kwon |
| 2008/0165151 A1 | 7/2008 | Lemay et al. |
| 2008/0174562 A1* | 7/2008 | Kim .................. G06F 3/04886 345/173 |
| 2008/0186808 A1 | 8/2008 | Lee |
| 2009/0174680 A1 | 7/2009 | Anzures et al. |
| 2010/0060586 A1 | 3/2010 | Pisula et al. |
| 2010/0123734 A1 | 5/2010 | Ozawa et al. |
| 2010/0162105 A1 | 6/2010 | Beebe et al. |
| 2010/0164895 A1 | 7/2010 | Kim et al. |

* cited by examiner

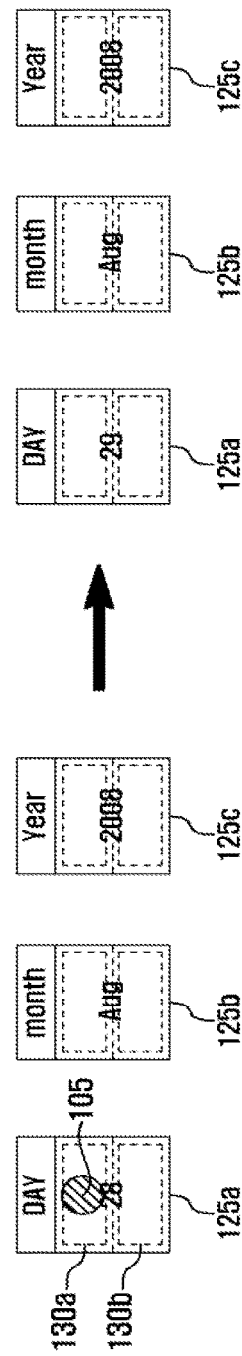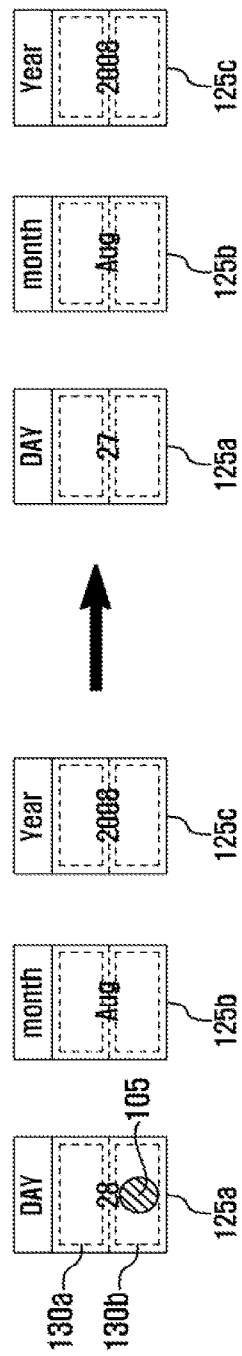

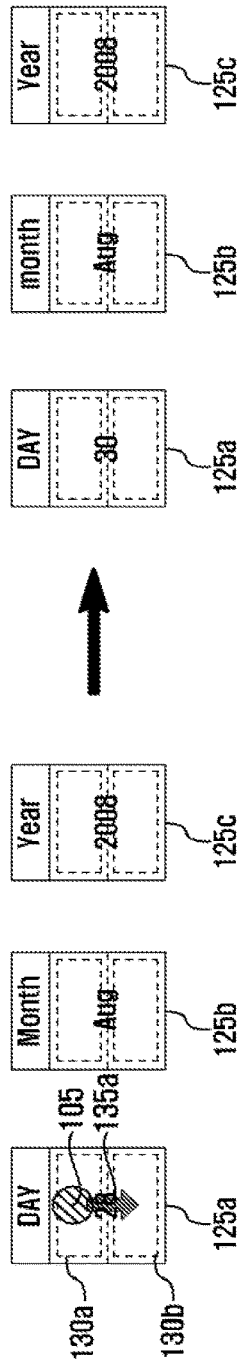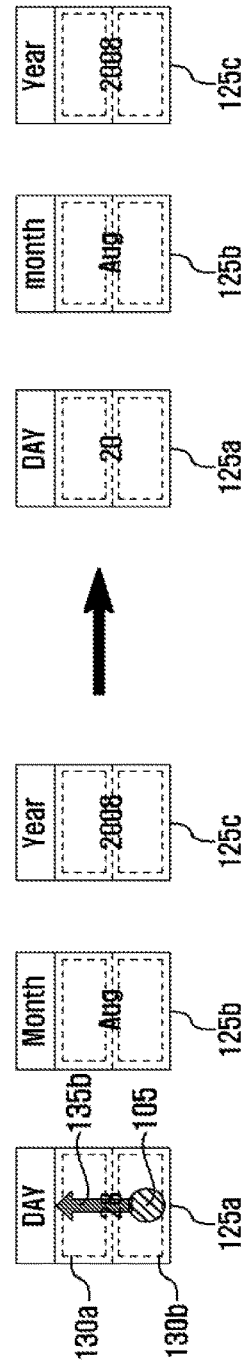

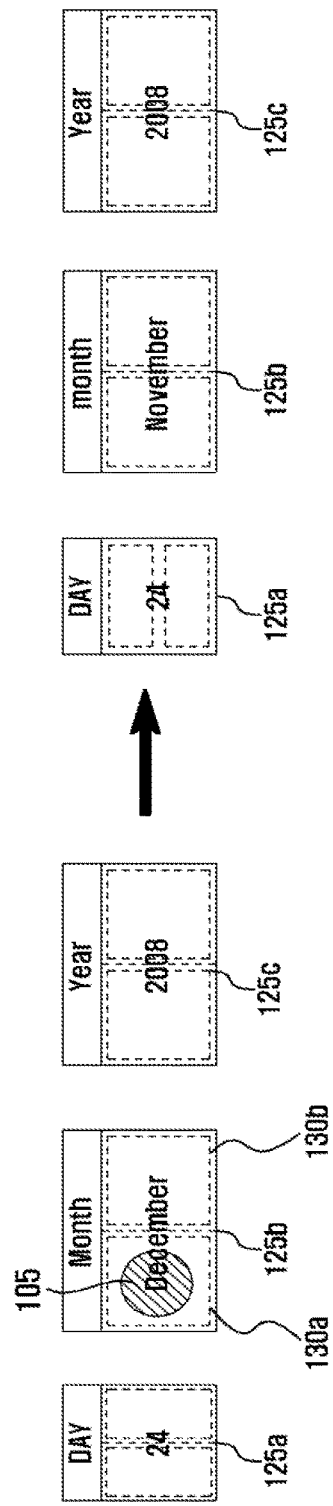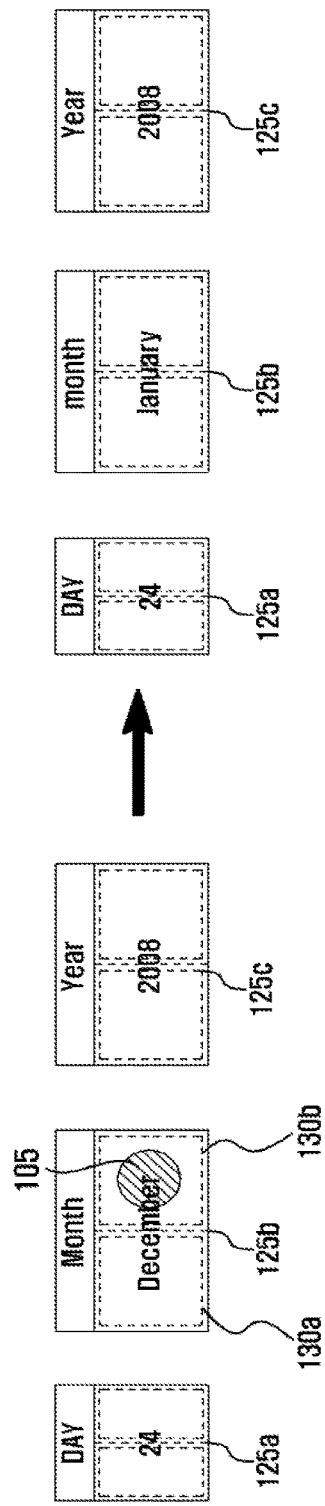

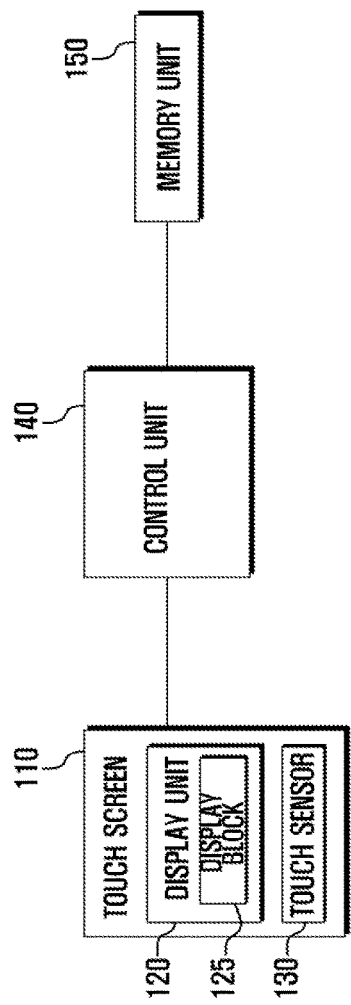
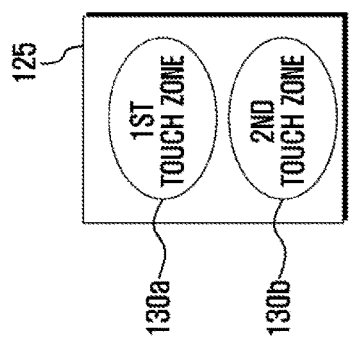

ELECTRONIC DEVICE HAVING TOUCH SCREEN AND METHOD FOR CHANGING DATA DISPLAYED ON THE TOUCH SCREEN

CROSS REFERENCE TO RELATED APPLICATION

This application is a continuation application of prior application Ser. No. 12/643,538, filed on Dec. 21, 2009, which claimed the benefit under 35 U.S.C § 119(a) of a Korean patent application filed on Dec. 22, 2008 in the Korean Intellectual Property Office and assigned Serial No. 10-2008-0131299, the entire disclosure of which is hereby incorporated by reference.

BACKGROUND OF THE INVENTION

Field of the Invention

Exemplary embodiments of the present invention relate to a device having a touch screen and a method for changing data displayed on the touch screen of the device. In particular, exemplary embodiments of the present invention relate to a method for replacing time-related data displayed on the touch screen with new data according to a touch gesture or a drag gesture.

Description of the Background

Electronic devices can provide a user with the convenience of mobility and a rich set of services and features. Examples of electronic devices include a personal computer, a notebook, a mobile phone, a personal digital assistant (PDA), a smart phone, a portable multimedia player (PMP), a music player (e.g. an MP3 player), a digital multimedia broadcasting (DMB) receiver, and a car navigation system.

Additionally, many electronic devices today can include a touch screen which can be used as a display unit and an input unit. Electronic devices having a touch screen may not require an additional display and other types of input units. Accordingly, a touch screen may be used in small-scale portable devices.

A reduction in size of an electronic device may, however, restrict the capability of simultaneously displaying data on the touch screen of the device. Also, some functions executed in the device may often require many regions for displaying related data on the screen, so the graphical configuration of elements displayed on the screen may become complicated. These problems may be more serious in cases where time-related functions such as scheduling a task or outputting an alarm need to be executed.

Additionally, when time-related data such as time, date, and time period are displayed, a user who may want to select or change specific data may often suffer the inconvenience of having to touch the touch screen several times.

SUMMARY OF THE INVENTION

Exemplary embodiments of the present invention provide a device having a touch screen and a method for changing data displayed on the touch screen of the device.

Additional features of the invention will be set forth in the description which follows, and in part will be apparent from the description, or may be learned by practice of the invention.

Exemplary embodiments of the present invention disclose a method for changing data displayed on a device. The method includes displaying a time data in a display block. And the display block is arranged on a touch screen. The method also includes detecting a touch gesture or a drag gesture on the display block. The method includes replacing the time data with a second time data according to the touch gesture or the drag gesture.

Exemplary embodiments of the present invention disclose a device including a display unit including a display block to display a time data. The device also includes a touch sensor configured to detect a touch gesture or a drag gesture. And the touch sensor is arranged in the display block. The device further includes a control unit configured to control the display unit to display the time data, and configured to replace the time data in the display block with a second time data in response to detection of the touch gesture or the drag gesture.

Exemplary embodiments of the present invention disclose a method for receiving time data currently being indicated from a display block in time data display mode and the display block may be arranged to a screen. The method also includes determining a value of a touch gesture or a drag gesture applied to the display block. And the value corresponds to a speed, a distance, a direction and a duration of the respective gesture and a coordinated gesture based on the touch gesture and the drag gesture. The method also includes replacing the time data with new time data according to the value determined by the touch gesture, the drag gesture, and the coordinated gesture.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 2A and FIG. 2B are exemplary views each of which illustrate a change in time data by a touch gesture according to exemplary embodiments of the present invention.

FIG. 4A and FIG. 4B are exemplary views each of which illustrate a change in time data by a drag gesture according to exemplary embodiments of the present invention.

FIG. 5A and FIG. 5B are exemplary views each illustrating a change in time data by a touch gesture according to exemplary embodiments of the present invention.

FIG. 6A is a block diagram illustrating a configuration of an electronic device according to exemplary embodiments of the present invention.

FIG. 6B is a schematic view which illustrates touch zones in a display block of a device according to exemplary embodiments of the present invention.

DETAILED DESCRIPTION OF THE ILLUSTRATED EMBODIMENTS

Figure 1:
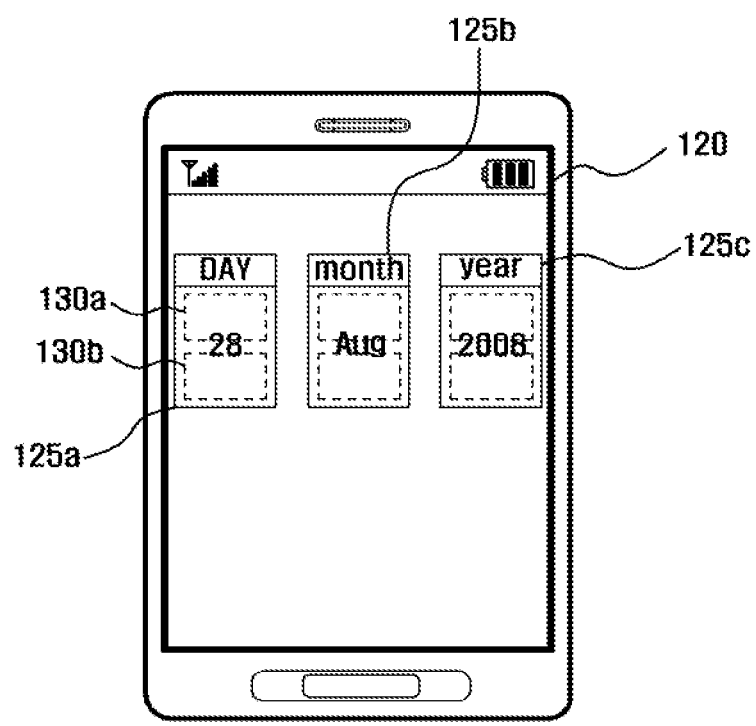
FIG. 1 is an exemplary view illustrating an electronic device displaying time data according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Prior to explaining exemplary embodiments of the present invention, relevant terminology will be defined for the description below.

Among terms set forth herein, a 'time data' may refer to data related to a date (e.g., day, month, and year), a unit of time (e.g., hour, minute, and second), an interval of time (e.g., a period, ante meridiem (A.M.), or post meridiem (P.M.)), and a day of the week.

A 'display block' may refer to a virtual block of a touch screen to display the time data. In general, a single display block may contain at least two touch zones, each of which can individually detect a contact and release an input tool, such as, for example, a user's finger or a stylus pen.

A 'time data display mode' may refer to a mode in which the time data may be displayed. The time data display mode may include, for example, a schedule mode to manage a user's schedule, an alarm mode to establish an alarm time, and a current time display mode to exhibit and to set a current time.

An 'electronic device' (or a 'device') may refer to an apparatus having a touch screen and displaying, on the touch screen, a variety of data including the time data. The electronic device can be, for example, a personal computer, a notebook, a mobile phone (e.g., cellular handset), a cordless phone, a mobile transmitter, a stationary wireless transmitter, a personal digital assistant (PDA), a smart phone, a portable multimedia player (PMP), a music player (e.g., an MP3 player), a digital multimedia broadcasting (DMB) receiver, a car navigation system, a pager, and any other type of portable or handheld terminal.

Hereinafter, exemplary embodiments of the present invention are described in detail with reference to the accompanying drawings.

FIG. 1 is an exemplary view illustrating an electronic device displaying time data according to exemplary embodiments of the present invention.

Referring to FIG. 1, the device may include a display unit 120 formed in a touch screen to output time data on the display unit 120. For example, the display unit 120 may display time data such as, for example, a day, a month and a year. The display unit 120 may further display a number of display blocks (e.g., three display blocks 125a, 125b and 125c) on which different time data (e.g., a day, a month, and a year) can be arranged respectively. Each of the display blocks 125a, 125b, and 125c may have two touch zones 130a and 130b, which can be arranged, for example, at an upper part and a lower part of each of the display block 125a, 125b, and 125c. Although FIG. 1 shows a day, a month, and a year as time data, exemplary embodiments of the present invention are not limited to time data related to a date. For example, any other time data described above may be alternatively or additively displayed. Furthermore, the number of display blocks may be limited, and the touch zones may be divided widthwise or diagonally.

When contact and release by a user's touch or drag gesture to select and change time data are detected at one of the touch zones 130a and 130b in a display block 125a, 125b, or 125c, the display unit 120 may change time data displayed in the selected display block under the control of a control unit 140. For example, if the first touch zone 103a detects contact and release of an input tool, such as the user's finger or a stylus pen, the display unit 120 may replace the current time data displayed in the selected display block with a following (e.g., next) time data. If the second touch zone 103b detects contact and release of the input tool, the display unit 120 may replace the currently displayed time data with a foregoing (e.g., previous) time data.

In some cases, the current time data displayed in the selected display block may be replaced with a following or foregoing time data, depending on a direction of a drag gesture regardless of the location of the touch zone at which the contact and release are detected.

Furthermore, an extent of a change in time data may be determined depending on duration of a touch gesture or a speed of a drag gesture applied to the first or second touch zones 130a and 130b.

Hereinafter, examples of a screen view in which time data is changed by a touch gesture or a drag gesture will be described with reference to FIG. 2A, FIG. 2B, FIG. 3, FIG. 4A, FIG. 4B, FIG. 5A and FIG. 5B.

FIG. 2A and FIG. 2B are exemplary views each of which illustrate a change in time data by a touch gesture according to exemplary embodiments of the present invention.

Referring to FIG. 2A, the display unit 120 may output a first time data, for example, '28,' which may correspond to a day of the month as shown in the first display block 125a. The display unit 120 may output a second time data, for example, 'Aug,' which may correspond to a month as shown in the second display block 125b, and may output a third time data, for example, '2008,' which may correspond to a year as shown in the third display block 125c.

When an input tool (e.g., the user's finger or a stylus pen) touches the first touch zone 130a of the first display block 125a and is released from the first touch zone 130a, the display unit 120 may replace the first time data '28' of the first display block 125a with a following first time data, for example, '29,' under the control of the control unit 140. The first touch zone 130a may be touched at a touch point 105 by the input tool to replace the first time data '28' with the following first time data '29.' Accordingly, a change of time data may require contact and release in the same touch zone.

In some cases, a time data may be changed even when contact and release are detected from different touch zones. For example, a drag gesture may be applied from one touch zone to another. If a contact is detected in the first touch zone 130a and a release is detected in the second touch zone 130b, the display unit 120 may replace a currently displayed time data (e.g., first time data) with a following time data (e.g., following first time data). In some cases, time data may be changed based on the starting location of a drag gesture irrespective of the finishing location of the drag gesture. For example, if a drag gesture starts from the first touch zone 130a, the display unit 120 may replace the currently displayed time data with the following time data. In some cases, a time data may be changed based on a direction of a drag gesture irrespective of the location of the touch zone at which the contact and release are detected.

Referring to FIG. 2B, when the input tool touches the second touch zone 130b in the first display block 125a and is subsequently released from the second touch zone 130*b*, the display unit 120 may replace the first time data '28' of the first display block 125*a* with a previous first time data, for example, '27,' under the control of the control unit 140. In some cases, if a contact is detected in the second touch zone 130*b* and a release is detected in the first touch zone 130*a*, (e.g., a drag gesture is applied from the second touch zone 130*b* to the first touch zone 130*a*), the display unit 120 may replace the first time data with the previous time data. In some cases, a time data may be changed depending on a starting location or a direction of a drag gesture.

Figure 3:
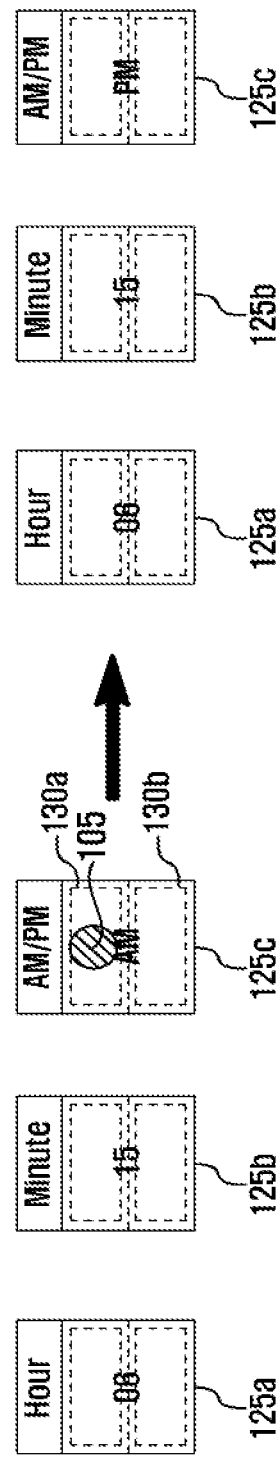
FIG. 3 is an exemplary view illustrating a change in time data by a touch gesture according to exemplary embodiments of the present invention.

FIG. 3 is an exemplary view which illustrates a change in time data by a touch gesture according to exemplary embodiments of the present invention.

Referring to FIG. 3, the display unit 120 may output a first hour time data, for example, '6,', which may correspond to an hour of a day, in the first display block 125*a*. The display unit 120 may also output a first minute time data, for example, '15,' which may correspond to a minute of an hour, in the second display block 125*b*, and a first interval time data, for example, 'AM,' which may correspond to a time interval (e.g., A.M./P.M.) in the third display block 125*c*.

When the input tool touches a first touch zone 130*a* in the third display block 125*c* and is subsequently released from the first touch zone 130*a*, the display unit 120 may replace the first interval time data 'AM' with a following first interval time data 'PM' under the control of the control unit 140.

As discussed hereinabove, individual time data can be displayed in each display block 125*a*, 125*b*, and 125*c*, and one of the display blocks 125*a*, 125*b*, and 125*c* can be selected by a contact and release of the input tool. A time data being displayed in the selected display block may be replaced with the following or previous time data, as noted above, according to the location of the touch zone at which the contact and release are detected. Therefore, the change in time data may be determined according to a touch location.

In some cases, a time data may be replaced with the following or previous time data according to the direction of a drag gesture, which may be implemented by moving the input tool from one touch zone to another.

In some cases, a drag gesture may be applied to a single touch zone and a drag direction may be determined by using start and finish coordinates of the drag gesture.

The change in time data may also be determined, at least partially, on duration of a touch gesture applied to a touch zone or a speed of the drag gesture.

FIG. 4A and FIG. 4B are exemplary views each of which illustrate a change in time data by a drag gesture according to exemplary embodiments of the present invention.

Referring to FIG. 4A, the display unit 120 may output the first time data, for example, '28,' which may correspond to a day in a month, as shown in the first display block 125*a*. The display unit 120 may output the second time data 'Aug,' which may correspond to a month, as shown in the second display block 125*b*, and may output the third time data '2008,' which may correspond to a year, as shown in the third display block 125*c*. The extent of change in the time data may be determined according to a speed of a drag gesture. The speed of the drag gesture may be obtained, for example, by dividing a distance between the touch and the release of the drag gesture by a time between the touch and the release of the drag gesture.

For example, referring to FIG. 4*a*, a drag gesture may be completed when an input tool touches 105 the first touch zone 130*a* in the first display block, and travels toward the second touch zone 130*b* as indicated by arrow 135*a*. The input tool may be released at second touch zone 130*b*. Accordingly, the display unit 120 may replace the time data (e.g., current time data) being displayed in the first display block 125*a* at the instant when the input tool touches the first touch zone 130*a* with following time data, depending on the downward magnitude of the drag gesture. For example, if a drag gesture having a downward direction starts and ends within the first touch zone 130*a*, the display unit 120 may replace the current time data with the following time data.

Additionally, the control unit 140 may calculate a speed of the drag gesture. If, for example, a calculated speed of the drag gesture corresponds to a change value '2,' the display unit 120 may replace the current time data '28' with the following time data '30.'

If a drag gesture is detected within a single touch zone, the control unit 140 may calculate a velocity of the drag gesture using the touch and release coordinates of the drag gesture. The velocity of the drag gesture can be a vector quantity having a magnitude corresponding to a drag speed and a direction corresponding to a drag direction.

Referring to FIG. 4B, a drag gesture may be completed when the input tool touches the second touch zone 130*b* in the first display block 125*a*, moves towards the first touch zone 130*a* as indicated by arrow 135*b*, and is released from the first touch zone 130*a*. The display unit 120 may replace a current time data in the first display block 125*a* with the previous time data, according to the upward direction of the drag gesture.

In addition, the control unit 140 may calculate a speed of the drag gesture. For example, if the speed of the drag gesture corresponds to a change value '8,' the display unit 120 may replace the current time data, for example, '28,' with the previous time data, for example, '20.'

In the description hereinabove, the time data can be determined according to a speed or velocity of a drag gesture. However, exemplary embodiments of the invention are not limited thereto. The change in time data may also be determined according to a travel distance of a drag gesture. In addition, when a touch gesture is applied instead of a drag gesture, the change in time data may be determined according to the duration of the touch gesture.

In some cases, a user may manipulate a relation between the touch location and a directionality of a change in time data, or a relation between the drag direction and the directionality of a change in time data.

In addition, in some cases, as shall be described hereinafter, the touch zones 130*a*, 130*b* may be divided widthwise or diagonally in the display blocks 125*a*, 125*b*, and 125*c*.

FIG. 5A and FIG. 5B are exemplary views each illustrating a change in time data by a touch gesture according to exemplary embodiments of the present invention.

Referring to FIG. 5A, the display unit 120 may output first time data, for example, '24,' which may correspond to a day of a month, in the first display block 125*a*. The display unit 120 may also output second time data, for example, 'December,' which may correspond to a month, in the second display block 125*b*, and the third time data, for example, '2008,' which may correspond to a year, in the third display block 125*c*. The first touch zone 130*a* and the second touch zone 130*b* may be arranged at a left portion and a right portion of the display block (e.g., display block 125*b*).

When the input tool, such as a user's finger or a stylus pen, touches the first touch zone 130*a* in the second display block 125*b* and is released from the first touch zone 130*a*, the display unit 120 may replace the second time data 'December' in the second display block 125b with a previous time data 'November' under the control of the control unit 140.

Referring to FIG. 5B, when the input tool touches the second touch zone 130b in the second display block 125b and is released from the second touch zone 130b, the display unit 120 may replace the second time data 'December' in the second display block 125b with a following time data 'January' under the control of the control unit.

Described hereinabove are examples in which time data is changed by a touch gesture or a drag gesture. Hereinafter, an electronic device for executing a change in time data by a touch or drag gesture will be described with reference to FIG. 6A and FIG. 6B.

FIG. 6A is a block diagram illustrating a configuration of an electronic device according to exemplary embodiments of the present invention. FIG. 6B is a schematic view illustrating a touch zone in a display block according to exemplary embodiments of the present invention.

An electronic device, as shown in FIG. 6A, may include a bus (not shown) or other communication mechanisms for communicating data, and a control unit 140 including a processor (not shown) coupled to the bus for processing information. The electronic device may also include memory unit 150, which may be a random access memory (RAM) or a dynamic storage device coupled to the bus for storing information and instructions to be executed by the processor. The memory unit 150 may also be used for storing temporary variables or intermediate information during execution of instructions by the processor. The memory unit 150 may be a read only memory (ROM) or other static storage device coupled to the bus for storing static information and instructions for the processor. The memory unit 150 may include a series of applications to operate the electronic device. Examples of suitable applications include a touch application, a pressure application, an image application, and a direction application.

The display unit 120, including display block 125, may be coupled to the touch screen 120. Examples of the display unit 120 include, for example, a liquid crystal display, a flexible display, or active matrix display, for displaying information to the user. In some cases, the touch screen 120 may be an input device, such as a keyboard, including alphanumeric and other keys. The input device may be coupled to the bus and may communicate information and command selections to the processor. The input device may include various types of sensors (e.g., touch sensor 130) and may include a plurality of touch zones 130a and 130b in the display block 125 for detecting user input. The input device may further include a cursor control, such as a mouse, a trackball, or cursor direction keys, for communicating direction information and command selections to the processor and for controlling cursor movement on the display unit 120.

According to various exemplary embodiments of the invention, execution of the instructions contained in memory unit 150 may cause the processor to perform processes according to the instructions. The control unit 140 may include one or more processors in a multi-processing arrangement to execute the instructions contained in memory unit 150. Hard-wired circuitry may be used in place of, or in combination with, software instructions to implement one or more of the exemplary embodiments of the present invention. For example, reconfigurable hardware, such as Field Programmable Gate Arrays (FPGAs), can be used, and functionality and connection topology of the FPGA logic gates may be customized at run-time, typically by programming memory look up tables. Thus, exemplary embodiments of the present invention are not limited to any specific combination of hardware circuitry and/or software.

The electronic device may also include at least one communication interface unit (not shown). The communication interface unit may provide a two-way data communication coupling to a network link (not shown). The communication interface unit may send and receive electrical, electromagnetic, or optical signals that can carry digital data streams representing various types of information. Further, the communication interface unit may include peripheral interface devices, such as a Universal Serial Bus (USB) interface, or a PCMCIA (Personal Computer Memory Card International Association) interface.

The processor may execute transmitted code and/or may store the transmitted code in the memory unit 150, or in other non-volatile storage. In some cases, the electronic device may obtain application code in the form of a carrier wave.

A "computer-readable medium" may refer to any medium that provides instructions to the processor for execution. Such a medium may be implemented in various forms, including but not limited to, non-volatile media, volatile media, and transmission media. Non-volatile media may include, for example, optical or magnetic disks, such as the storage device. Volatile media may include dynamic memory, such as main memory. Transmission media may include coaxial cables, copper wire and fiber optics, including the wires that comprise the bus. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other suitable magnetic medium, a compact disk read-only memory (CD-ROM), compact disc rewritable (CDRW), digital video disc (DVD), any other suitable optical medium, punch cards, optical mark sheets, any other suitable physical medium with patterns of holes or other optically recognizable indicia, a random-access memory (RAM), a programmable read-only memory (PROM), and erasable programmable read-only memory (EPROM), a FLASH-EPROM, any other memory chip or cartridge, and a carrier wave.

Various forms of computer-readable media may be involved in providing instructions to a processor for execution. For example, the instructions for carrying out at least part of the present invention may be implemented on a magnetic disk of a remote computer. The remote mobile terminal may load the instructions into the memory unit 150 and may send the instructions, for example, over a telephone line using a modem. A modem of a local system may receive the data on a telephone line and/or may be used an infrared transmitter to convert the data to an infrared signal and may transmit the infrared signal to the electronic device. The electronic device may receive information and instructions provided by the infrared signal. The bus may provide the information and instructions to the memory unit 150, from which a processor may retrieve and execute the instructions. The instructions received by memory unit 150 may optionally be stored either before or after execution by the control unit 140.

Referring to FIG. 6A, the device may include a touch screen 110, a control unit 140, and a memory unit 150.

The touch screen 110 may include a display unit 120 and a touch sensor 130. The display unit 120 may be coupled to the control unit 140 and may be configured to display graphical data, on a screen. The data may be related to a state or operation of the device and/or may be produced by execution of functions in the device. The display unit 120 may display time data using at least one display block 125 (e.g., 125*a*, 125*b*, 125*c*) under the control of the control unit 140. Additionally, the display unit 120 may change time data of one of the display blocks 125 under the control of the control unit 140 in response to a touch gesture or a drag gesture being detected by the touch sensor 130.

Referring to FIG. 6B, the display block 125 may include the first touch zone 130*a* and the second touch zone 130*b*. Although the first and second touch zones 130*a* and 130*b* may be arranged at an upper part and a lower part of the display block 125, as shown in FIG. 6B, exemplary embodiment of the present invention are not limited thereto. For example, the first touch zone 130*a* and second touch zones 130*b* may be divided widthwise or diagonally in the display block 125, as described above.

When time data is changed, the display unit 120 may use a dynamic graphical effect to provide a user with visual feedback for indicating a change in time data. For example, the display unit 120 may render a rightward turning motion and/or leftward turning motion on the display block 125 as if pages of a book are turned. In some cases, the display unit 120 may render a rightward rolling motion or a leftward rolling motion to the display block 125 as if a small cube is rotated. In general, a change in time data may be represented in any suitable manner.

A page-turning effect can be described as follows. Display block 125 can be divided into a first touch zone 130*a* and a second touch zone 130*b*, which may be arranged at a left portion and a right portion of the display block 125, respectively. If a touch gesture is detected on the first touch zone 130*a*, the display unit 120 may replace the time data being displayed in the display block 125 at the instant the touch gesture is detected with a previous time data by the control unit 140. For example, time data displayed on the left portion corresponding to the first touch zone 130*a* may appear to turn and be displayed on the right portion corresponding to the second touch zone 130*b*. The display block 125 may then display the previous time data on the left portion.

The touch sensor 130 may be provided near the display unit 120 and may detect a touch gesture or a drag gesture by the input tool. The touch sensor 130 may detect the contact or release of the input tool on a surface of the touch screen 110. The touch sensor 130 may determine coordinates of the contact and the release and may transmit the coordinates to the control unit 140. Based on the contact and release coordinates, the control unit 140 may determine whether a user's input gesture is a touch event or a drag gesture. In addition, the control unit 140 may further determine which display block is selected and which touch zone is touched. The control unit 140 may also determine a direction and a distance of the drag gesture, and may calculate the speed (e.g., velocity) of the drag gesture from the contact and release coordinates.

The control unit 140 may execute functions and operation of elements in the device. For example, when a time data display mode is selected by a user, the display unit 140 may control the display unit 120 to display a time data. A time data may be displayed in each display block 125. In addition, the control unit 140 may divide each display block 125 into a plurality of touch zones, for example, the first touch zone 130*a* and the second touch zone 130*b*.

When a contact of the input tool is detected by the touch sensor 130, the control unit 140 may select a display block 125 (e.g., 125*a*, 125*b*, and 125*c*) at which the contact is detected. The control unit 140 may then determine which of the first touch zone 130*a* and second touch zone 130*b* in the selected display block 125 can be contacted. Furthermore, the control unit 140 may ascertain the time data displayed in the selected display block 125.

In order to change the displayed time data, the control unit 140 may determine a directionality of a change in the time data. The control unit 140 may determine whether to replace time data being displayed with the following time data or with the previous time data. The change directionality of time data may be determined according to a location of a touch zone on which a touch gesture is detected. For example, the contact and release on the first touch zone 130*a* can be regarded as a forward change, and the contact and release on the second touch zone 130*b* can be regarded as a backward change. Accordingly, if the first touch zone 130*a* is touched, the control unit 140 may replace the time data being displayed (e.g., '28') with the following time data (e.g., '29').

The change directionality of time data may also be determined according to a direction of a drag gesture. For example, a drag gesture applied from a first touch zone 130*a* to a second touch zone 130*b* can be regarded as a forward change. A drag gesture from the second touch zone 130*b* to the first touch zone 130*a* may be regarded as a backward change. In some cases, a drag gesture may be detected within a single touch zone and the drag direction may be determined by using both start and finish coordinates of the drag gesture.

The control unit 140 may further determine a change in the time data being displayed. For example, the change may depend on a speed of a drag gesture. The drag speed may be obtained by dividing a traveled distance by a time of travel. For example, the control unit 140 may determine the duration of a drag gesture from a difference between a start time of the drag gesture and a finish time of the drag gesture. The control unit 140 may also determine a drag distance from a difference between the start point and the finish point of the drag gesture. The control unit 140 may calculate a drag speed and determine a change in time data value by referring to a mapping data mapping the drag speed to the change in time data value.

For example, a drag distance may be 4 mm and a drag duration may be 400 ms. The control unit 140 may calculate the drag speed to be, for example, 0.01 mm/ms by dividing the drag distance (e.g., 4 mm) by the drag duration (e.g., 400 ms). If the drag speed (e.g., 0.01 mm/ms) corresponds to a change value of, for example '5,' the control unit 140 may replace the time data being displayed (e.g., '10') with a fifth following time data (e.g., '15') in response to the forward change.

The change in time data may also be determined according to a duration of a touch gesture. For example, if a touch gesture is maintained for more than a predefined time, the control unit 140 may change the time data being displayed according to a period. For example, if the predefined time is, for example, three seconds and the period is, for example, 100 ms, the control unit 140 may change the time data being displayed once in 100 ms after the touch gesture is maintained for three seconds. The time data may continuously change until the touch gesture is finished, (e.g., until the contact is released).

The memory unit 150 may store various types of application programs and data required for execution of functions in the device. For example, the memory unit 150 may store a time data to be displayed using a time data display mode, such as, for example, a schedule mode or a current time display mode. Additionally, the memory unit 150 may store mapping data to map a drag speed to a change value for a time data, as shown in TABLE 1.

| Drag Speed | Change Value |
|---|---|
| 0.5~1 mm/ms | 2 |
| 1~2 mm/ms | 5 |
| 2~3 mm/ms | 10 |
| 3~4 mm/ms | 20 |
| 4~5 mm/ms | 30 |

As described above, the control unit 140 may use a mapping data to determine a change in time data based on a drag speed and a drag gesture. Mapping data, as shown in TABLE 1, is exemplary only and should not be considered as limiting exemplary embodiments of the present invention. Mapping data may be set or adjusted by the user of the device.

Hereinafter, a method for changing time data in an electronic device according to a touch or drag gesture is described with reference to FIG. 7 and FIG. 8.

Figure 7:
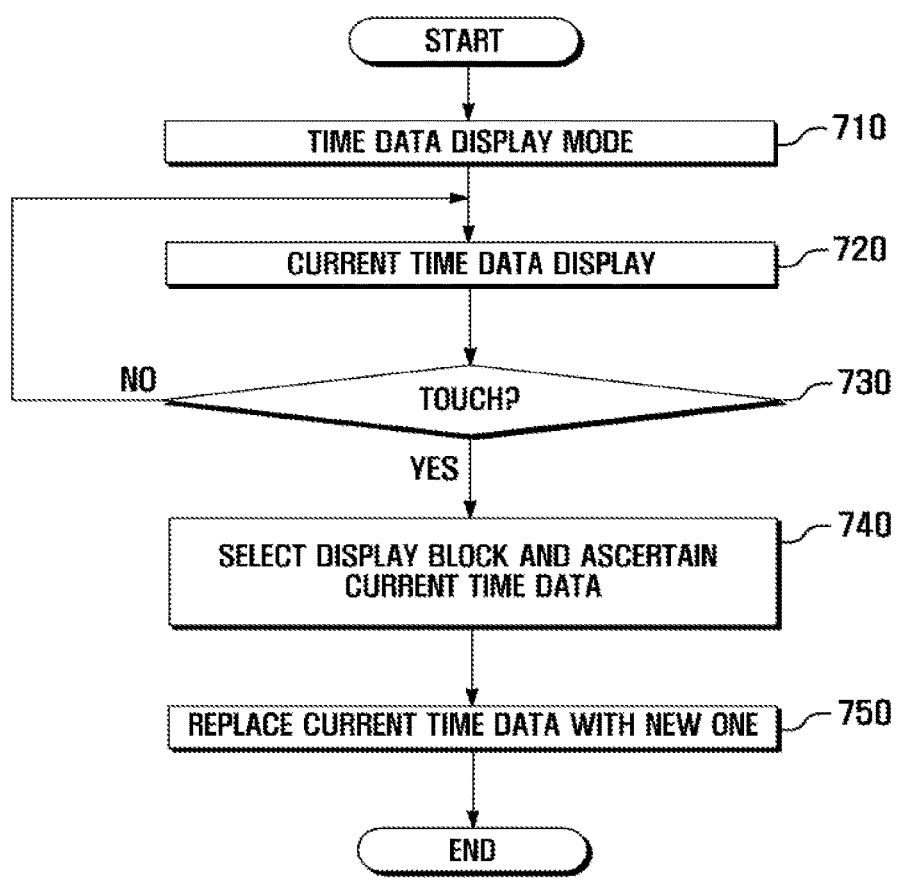
FIG. 7 is a flow diagram illustrating a method for changing time data displayed on a touch screen of an electronic device according to exemplary embodiments of the present invention.

FIG. 7 is a flow diagram illustrating a method for changing time data displayed on a touch screen of an electronic device according to exemplary embodiments of the present invention.

Referring to FIG. 7, when a user selects a time data display mode, such as, for example, a schedule mode or a current time display mode, by using a menu or a function key, the control unit 140 may execute the time data display mode (step 710).

The control unit 140 may then control the display unit 120 to display a time data (step 720). The time data may be a time data corresponding to a time when the user selects the time data display mode and may be live time data. If the time data is related to a date, the time data can be displayed in three display blocks (e.g., 125a, 125b, and 125c) of the display unit 120 under the control of the control unit 140. For example, when the date is Dec. 24, 2008, the control unit 140 may output a time data '24' corresponding to the day in the first display block 125a, a time data 'Dec' corresponding to the month in the second display block 125b, and a time data '2008' corresponding to the year in the third display block 125c, respectively.

Next, the control unit 140 may determine whether an input tool (e.g., a user's finger or a stylus pen) is detected on a surface of the touch screen 110 (step 730). If no touch of the input tool is detected, the process may return to step 720 and the control unit 140 may continue to display the time data.

If a touch of the input tool is detected on the surface of the touch screen 110, the control unit 140 may determine a display block 125 at which the touch is detected, and may determine the time data displayed in the display block 125 (step 740). In step 740, the control unit 140 may also determine which touch zone in the display block 125 is touched.

Next, the control unit 140 may determine a directionality and a change in the time data. The control unit 140 may replace the time data displayed in the display block 125 with new time data which may be determined according to the determined directionality and a change (step 750). The directionality of the time data may be determined depending on a location (i.e., touch point) of the touch or the drag direction. In addition, the change in time data may be determined according to the duration of the touch or the drag speed. The step 750 is further described in detail with reference to FIG. 8. FIG. 8 is a flow diagram illustrating a process of changing time data according to exemplary embodiments of the present invention.

Figure 8:
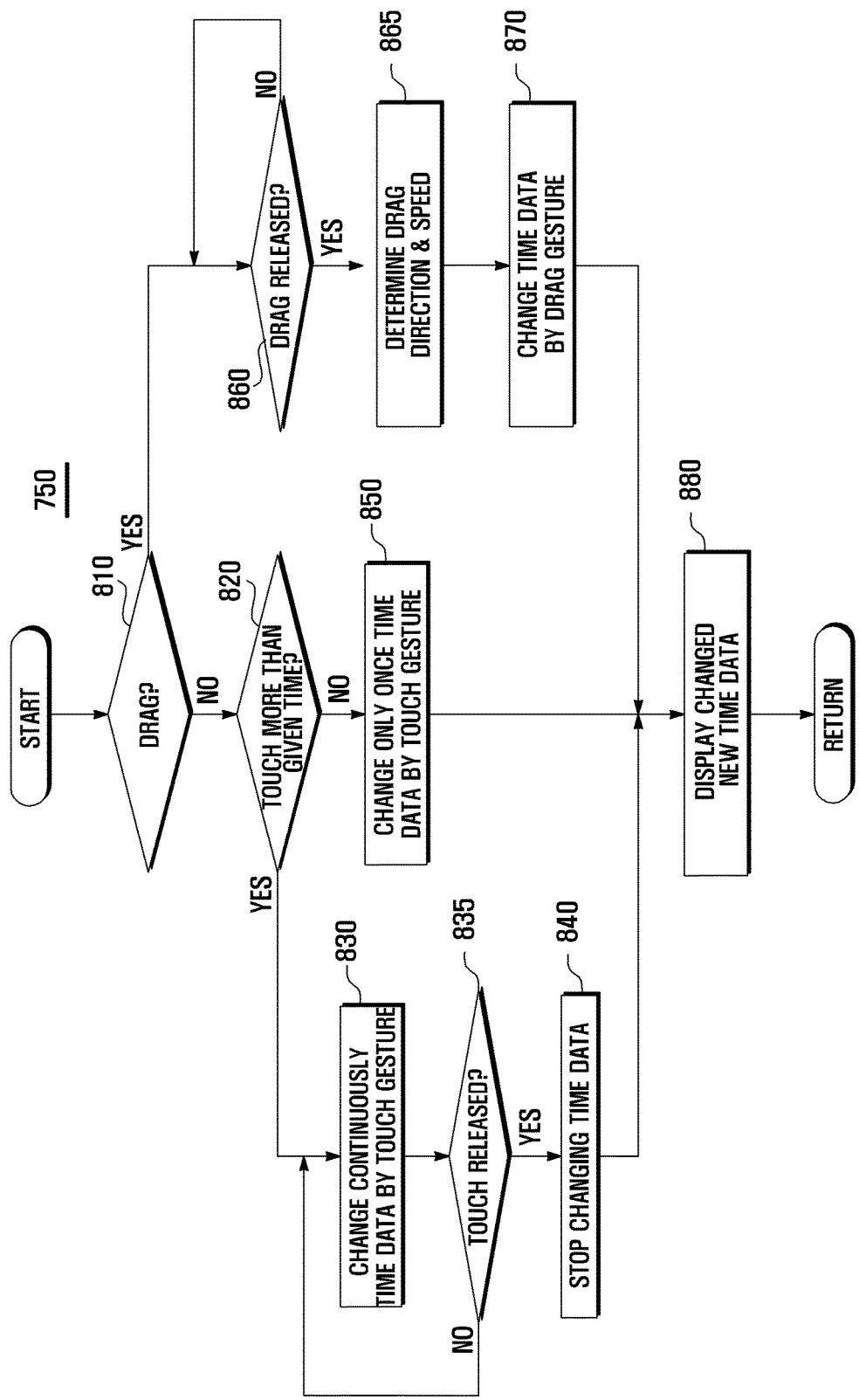
FIG. 8 is a flow diagram illustrating a method for changing time data according to exemplary embodiments of the present invention.

Referring to FIG. 8, the control unit 140 may determine whether the touch point can move (step 810), (i.e., whether the user's input is a touch gesture or a drag gesture). If the control unit 140 determines that the touch point cannot move (e.g., if the user's input is a touch gesture), the control unit 140 may further determine whether a touch gesture is maintained for more than a predefined time (step 820).

If a touch gesture is maintained for more than the predefined time, the control unit 140 may continuously change the time data being displayed according to a period (step 830). The change directionality of time data can be based on a location of the touch zone at which the touch gesture is detected, and may be determined in step 830 as described above. If the touch gesture is continuously detected on the first display block 125a displaying a time data, for example, '24,' and if the change directionality is determined as a forward change, the control unit 140 may change time data to following data (e.g., '25,' '26,' and/or '27'. If the change directionality is determined as backward change, the control unit 140 may change time data to the previous data (e.g., '23,' '22,' and '21.')

Next, the control unit 140 may determine whether a touch gesture is released from the touch screen (step 835). If the release is detected, the control unit 140 may stop changing time data (step 840). If no release is detected, the controller 140 may return to step 830. After step 840, the control unit 140 may maintain the time data finally being displayed when changing time data is stopped (step 880).

If, in step 820, the touch gesture is not maintained more than the predefined time, (e.g., if the touch gesture is released before the predefined time expires), the control unit 140 may change the time data being displayed once (step 850). The change directionality of time data may be based on a location of the touch zone at which the touch gesture is detected, and may be determined as described above. If the touch gesture is detected on the first display block 125a displaying time data, for example, '24,' and if the change directionality is determined as a forward change, the control unit 140 may change the time data once to the following data, for example, '25.' If the change directionality is determined as a backward change, the control unit 140 may change the time data once to the previous data, for example, '23.' The control unit 140 may then display the changed time data (step 880).

If, in step 810, the touch point move (e.g., if the user input is a drag gesture), the control unit 140 may determine whether the drag gesture is released (step 860). If the drag gesture is released, the control unit 140 may determine a drag direction and a drag speed as described above (step 865). For example, the control unit 140 may obtain the drag direction and the drag distance by using contact and release coordinates corresponding to a start point and a finish point of the drag gesture. In addition, the control unit 140 may obtain a drag time by using a start time and a finish time of the drag gesture. The control unit 140 may then calculate a drag speed by dividing the drag distance by the drag time.

Next, the control unit 140 may change the time data by using both the drag direction and the drag speed (step 870). The control unit 140 may then display the changed time data (step 880).

For example, a touch point of a drag gesture may be detected to move from a first touch zone 130a to a second touch zone 130b in a first display block 125a displaying a time data '24,' and the drag speed may be 2.5 mm/ms. The control unit 140 may determine a change value by referring to a mapping data to map the drag speed range to a change value. If the drag speed 2.5 mm/ms corresponds to a change value '10,' the control unit 140 may replace the time data '24' being displayed in the first display block 125*a* with the tenth following data '3.' If the date being displayed is, for example, Dec. 24, 2008, the second display block 125*b* displaying 'Dec' and the third display block 125*c* displaying '2008' may automatically be replaced with 'Jan' and '2009,' respectively.

If a touch point of a drag gesture is detected to move from the second touch zone 130*b* to the first touch zone 130*a* in the first display block 125*a*, the control unit 140 may change the current time data '24' to the tenth foregoing data '14.'

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method, comprising:
  displaying first time data on a display area;
  detecting a touch gesture on the display area displaying the first time data;
  when the touch gesture is maintained on a touch zone of the display area for less than a predefined time period, displaying, on a touch screen, second time data in the display area, the second time data being different than the first time data by one unit of time; and
  when the touch gesture is maintained on the touch zone of the display area for an amount of time that is greater than or equal to the predefined time period, displaying, on the touch screen, time data in the display area, the time data being continuously changing by one unit of time according to a period of time.

2. The method of claim 1,
  wherein the first time data is replaced with the second time data such that the second time data comprises following time data, the following time data being displayed in response to a detection of the touch gesture in a first touch zone on the display area, and
  wherein the first time data is replaced with the second time data such that the second time data comprises previous time data, the previous time data being displayed in response to a detection of the touch gesture in a second touch zone on the display area.

3. The method of claim 1,
  wherein the first time data is replaced with the second time data such that the second time data comprises following time data, the following time data being displayed in response to a detection of a drag gesture from a first touch zone to a second touch zone on the display area, and
  wherein the first time data is replaced with the second time data such that the second time data comprises previous time data, the previous time data being displayed in response to a detection of a drag gesture from the second touch zone to the first touch zone on the display area.

4. The method of claim 1, wherein, when the touch gesture on the display area is maintained for more than a time threshold, the first time data is continuously changed at a constant speed.

5. The method of claim 1, wherein the second time data is determined according to one of a speed, a travel distance, or a velocity of a detected drag gesture.

6. The method of claim 1, wherein the display area comprises a first touch zone and a second touch zone, the first touch zone and the second touch zone being disposed at one of an upper portion and a lower portion of the display area, respectively, or at a left portion and a right portion of the display area, respectively.

7. The method of claim 1, wherein the first time data and the second time data comprise at least one of:
  a date comprising a day, a month, and a year;
  a time comprising an hour, a minute, and a second;
  an interval of time comprising ante meridiem (A.M.), and post meridiem (P.M); or
  a day of a week.

8. The method of claim 1, wherein the first time data is displayed in a time data display mode comprising a schedule mode to manage a schedule, an alarm mode to establish an alarm time, and a time display mode to display and to set a time.

9. A device, comprising:
  a touch screen;
  at least one processor; and
  a memory storing instructions that, when executed, cause the at least one processor to:
    control the touch screen to display first time data on a display area,
    detect a touch gesture, via the touch screen, on the display area displaying the first time data,
    when the touch gesture is maintained on a touch zone of the display area for less than a predefined time period, control the touch screen to display second time data in the display area, the second time data being different than the first time data by one unit of time, and
    when the touch gesture is maintained on the touch zone of the display area for an amount of time that is greater than the predefined time period, control the touch screen to display time data in the display area, the time data being continuously changing by one unit of time according to a period of time.

10. The device of claim 9,
  wherein the first time data is replaced with the second time data such that the second time data comprises following time data, the following time data being displayed in response to a detection of the touch gesture in a first touch zone on the display area, and
  wherein the first time data is replaced with the second time data such that the second time data comprises previous time data, the previous time data being displayed in response to a detection of the touch gesture in a second touch zone on the display area.

11. The device of claim 9,
  wherein the first time data is replaced with the second time data such that the second time data comprises following time data, the following time data being displayed in response to a detection of a drag gesture from a first touch zone to a second touch zone on the display area, and
  wherein the first time data is replaced with the second time data such that the second time data comprises previous time data, the previous time data being displayed in response to a detection of a drag gesture from the second touch zone to the first touch zone on the display area.

12. The device of claim 9, wherein, when the touch gesture on the display area is maintained for more than a time threshold, the first time data is continuously changed at a constant speed.

13. The device of claim 9, wherein the second time data is determined according to one of a speed, a travel distance, or a velocity of a detected drag gesture.

14. The device of claim 9, wherein the display area comprises a first touch zone and a second touch zone, the first touch zone and the second touch zone being disposed at one of an upper portion and a lower portion of the display area, respectively, or at a left portion and a right portion of the display area, respectively.

15. The device of claim 9, wherein the first time data and the second time data comprise at least one of:
- a date comprising a day, a month, and a year;
- a time comprising an hour, a minute, and a second;
- an interval of time comprising ante meridiem (A.M.), and post meridiem (P.M); or
- a day of a week.

16. The device of claim 9, wherein the first time data is displayed in a time data display mode comprising a schedule mode to manage a schedule, an alarm mode to establish an alarm time, and a time display mode to display and to set a time.

\* \* \* \* \*